United States Patent
Sarles et al.

(10) Patent No.: US 6,359,426 B1
(45) Date of Patent: Mar. 19, 2002

(54) VOLTAGE THRESHOLD CIRCUIT FOR POWER CONDITIONER

(75) Inventors: F. Williams Sarles, Lexington, MA (US); John Anthony DeGregorio, Dover, NH (US)

(73) Assignee: Enterasys Networks, Inc., Rochester, NH (US)

( * ) Notice: Subject to any disclaimer, the term of this patent is extended or adjusted under 35 U.S.C. 154(b) by 0 days.

(21) Appl. No.: 09/449,439

(22) Filed: Nov. 24, 1999

(51) Int. Cl.[7] .................................................. G05F 1/40
(52) U.S. Cl. ........................................ 323/281; 323/901
(58) Field of Search ................................. 323/901, 908, 323/280, 281; 363/49

(56) References Cited

U.S. PATENT DOCUMENTS 5,266,884 A * 11/1993 Agiman ...................... 323/284
5,912,549 A * 6/1999 Farrington et al. ......... 323/207

* cited by examiner

*Primary Examiner*—Peter S. Wong
*Assistant Examiner*—Gary L. Laxton
(74) *Attorney, Agent, or Firm*—Devine, Millimet & Branch, P.A.; Paul C. Remus; Todd A. Sullivan (57) ABSTRACT

A voltage threshold circuit for the power factor correction stage of a power conversion system is provide. The circuit features a voltage threshold circuit with a comparator for (i) comparing a predetermined threshold voltage to the output voltage of a power factor correction stage of a power conditioner and (ii) outputting a signal if the output voltage is at least equal to the predetermined threshold voltage. The presence of the signal decreases the predetermined threshold voltage, thereby effectively changing the output voltage above which the comparator continues to output the signal.

12 Claims, 5 Drawing Sheets

VOLTAGE THRESHOLD CIRCUIT FOR POWER CONDITIONER

FIELD OF THE INVENTION

This invention relates to the field of power conditioning systems. More specifically, to power conditioning systems incorporating DC-DC conversion systems preceded by a power factor correction stage. Even more specifically, to power conditioning systems in which a control signal is generated to enable functioning of DC-DC power conversion systems during the periods in which power is initially supplied to and removed from the DC-DC power conversion systems.

BACKGROUND OF THE INVENTION

Power factor correction (PFC) is well known to reduce AC line input current harmonic distortion in power conversion systems. In a power conversion system utilizing a PFC stage, it is critical that the PFC stage be fully functional before any downstream DC-DC power conversion circuitry is allowed to function. Previous designs accomplish this power-up, or sequencing delay, through the use of capacitor-based timing circuitry which is designed to inhibit DC-DC converter turn-on for a time sufficient for the PFC stage to attain its operational output voltage. The use of such timing circuitry, however, necessitates relatively long idle periods between start-up sequences to ensure correct timing. If the power supply to a capacitor-based start-up delay circuit is rapidly switched on and off, such as may occur in hot swap conditions, the timing capacitor voltage at each power application can vary, resulting in incorrect time delays.

A second consideration in many applications of a DC-DC power conversion system is the desirability, following loss of input power, of maintaining the system output voltage above some specified minimum voltage for a given period, usually referred to as the "hold-up time". This hold-up provision enables the DC-DC conversion device to continue supplying power to the load through brief AC input line voltage dips and to provide capability for the equipment load to power-down in a controlled manner during an actual loss of power.

In many DC-DC converter designs, this hold-up time is determined by sizing the output capacitors for energy storage sufficient to support the load voltage for the required duration. The resulting capacitance usually ends up being far in excess of that required for output ripple voltage smoothing. In a low-power system design this practice probably has little economic impact, but in a high-power design the added cost can be significant.

Moreover, the added capacitance is not employed efficiently; if the allowable voltage drop during hold-up is 10 percent (typical), only 19 percent of the stored capacitor energy is useful for hold-up.

Some prior designs for hold-up rely on auxiliary storage capacitors which can be switched to various locations in the circuit design. See Bosse, et al., U.S. Pat. No. 4,743,835. Bosses et al. is incorporated herein by this reference. For the present invention, however, such auxiliary capacitors and switching means are extraneous. Consider, for example, the operation of the power conversion system design which incorporates a PFC stage having an output capacitor followed by one (or more) DC-DC conversion devices. In most PFC stage designs, the output capacitor operating voltage is about 10 to 20 percent above the peak AC line voltage; for a high-power system, line input will usually be nominally 220VAC rms with a high input line peak voltage of 370VAC and an output capacitor operating voltage of 400VDC. With loss of line input, the PFC stage ceases supplying power, but the DC-DC conversion device continues operating from the stored energy of the capacitor at its input. For DC-DC conversion devices designed to operate at 400VDC input (i.e. from the PFC stage output), it is usually not difficult or particularly costly to design for operation with input voltage at 70 to 50 percent of maximum during a brief hold-up period. This in turn means that about 50 to 75 percent of the PFC stage output capacitor stored energy can be utilized to power the DC-DC conversion device during the hold-up period. Under the conditions just set forth, the minimum output capacitance inherent in a PFC stage design would provide hold-up power for 25 to 40 milliseconds with the DC-DC conversion device maintaining output regulation; an increase in capacitance above the inherent minimum would correspondingly increase this time. When the DC-DC conversion device ceases functioning, its output capacitance will provide some additional hold-up time, the exact duration depending on both the value of capacitance and the amount of voltage sag which the equipment load will tolerate.

Under a loss of power scenario, the DC-DC power conversion device will experience a steadily decreasing input voltage as energy from the PFC stage output capacitor is used for hold-up. At some point, this input voltage will drop below that value required for proper functioning of the DC-DC power conversion device. It is important that the DC-DC conversion device be shut down properly while the input voltage is still adequate for proper operation; in high-power conversion systems, allowing operation to cease from collapsing input voltages, rather than shutting down, risks anomalous operating conditions with potential damage to power circuitry.

It is apparent, then, that during power-up a voltage threshold circuit is needed that can power the DC-DC converter at the proper PFC stage output voltage and functions independent of rapid power supply switching conditions such as during a hot swap.

Additionally, during loss of line power, a similar threshold circuit is needed that disables the DC-DC conversion device when it determines the capacitor voltage has dropped to or below a predetermined level. Previous power-up or hold-up sequencing circuitry designs have not combined power-up and hold-up control functionality due to these differing voltage threshold requirements. The present invention encompasses accurate alterable voltage threshold circuitry which provides full functionality for both power-up and hold-up sequences utilizing different voltage thresholds.

SUMMARY OF THE INVENTION

It is therefore an object of this invention to provide an improved power-up sequencing that provides accurate threshold functionality during rapid power switching conditions such as may occur during a hot swap.

It is a further object of this invention to provide an improved hold-up control system that provides accurate threshold functionality following loss of input power.

It is a still further object of this invention to provide a combined power-up sequencing and hold-up control system that provides full functionality for both power-up sequence and hold-up control that utilize different voltage thresholds.

This invention results from the realizations that a) the imprecision and complexity of capacitor-based timing circuits cause them to be unsuitable for proper power-up sequencing of a PFC stage/DC-DC conversion device power system; b) a far more reliable approach for power-up sequencing is to determine when the PFC stage output voltage has reached a proper operating threshold and to enable the DC-DC conversion device upon detecting attainment of that threshold; c) a design for hold-up time based solely on discharge of energy from the DC-DC conversion device output capacitors can lead to unduly high values for such output capacitors; d) the PFC stage output capacitor is better suited and more efficient for supplying energy for hold-up upon loss of system input power; e) the proper control of the DC-DC conversion device requires shutdown of that device when its input voltage has decreased to some predetermined design value; and f) all such objections, constraints and criteria are well met using a comparator circuit accurately to detect voltage levels and to provide for change of the threshold voltage from a first threshold for power-up sequencing to a second threshold for hold-up control.

This invention features a voltage threshold circuit with a comparator for (i) comparing a predetermined threshold voltage to the output voltage of a power factor correction stage of a power conditioner and (ii) outputting a signal if the output voltage is at least equal to the predetermined threshold voltage. The presence of the signal decreases the predetermined threshold voltage, thereby creating a hysteresis effect in the switching on and off of the comparator signal.

BRIEF DESCRIPTION OF THE DRAWINGS

The novel features believed characteristic of the invention are set forth in the appended claims. The invention itself however, as well as other features and advantages thereof, will be best understood by reference to the description which follows, read in conjunction with the accompanying drawings, wherein:

DETAILED DESCRIPTION OF THE INVENTION

Figure 1:
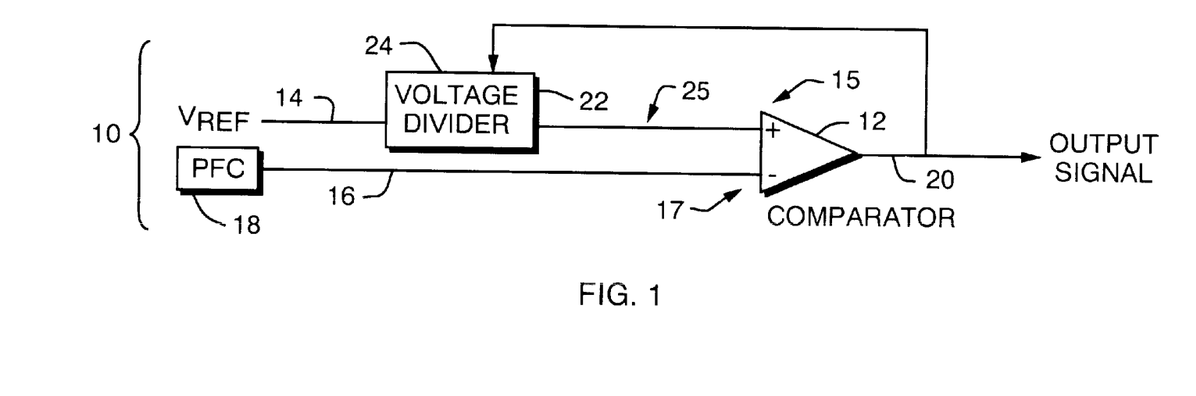
FIG. 1 shows a block diagram that illustrates the basic embodiment of this invention.

FIG. 1 shows a voltage threshold circuit 10 designed for use in power conditioners characterized by their use of a PFC stage 18 having an output voltage. Voltage threshold circuit 10 comprises comparator 12 for comparing predetermined threshold voltage 14, which is altered by the responsive means 22 into the threshold voltage signal 25, to first signal 16 corresponding to the output voltage $V_{pfc}$ of PFC stage 18. Comparator 12 has no output when the first signal 16, as received by second comparator input 17, is less than the threshold voltage signal 25, as received by first comparator output 15. Comparator 12 outputs second signal 20 in response to first signal 16 being a value at least equal to the threshold voltage signal 25 received at first comparator output 15. When comparator 12 outputs second signal 20, second signal 20 enables the passage of power downstream of the PFC stage 18 through the DC-DC power conversion systems, as will be described later in the Detailed Description.

Voltage threshold circuit 10 further comprises responsive means 22 responsive to second signal 20, which, in the embodiment shown in FIG. 1, alters the threshold voltage 14 as received by the comparator 12, but can alter either of the comparator inputs 15 and 17. In FIG. 1, responsive means 22 receives second signal 20 and predetermined threshold voltage 14 and outputs the threshold voltage signal 25.

Figure 2:
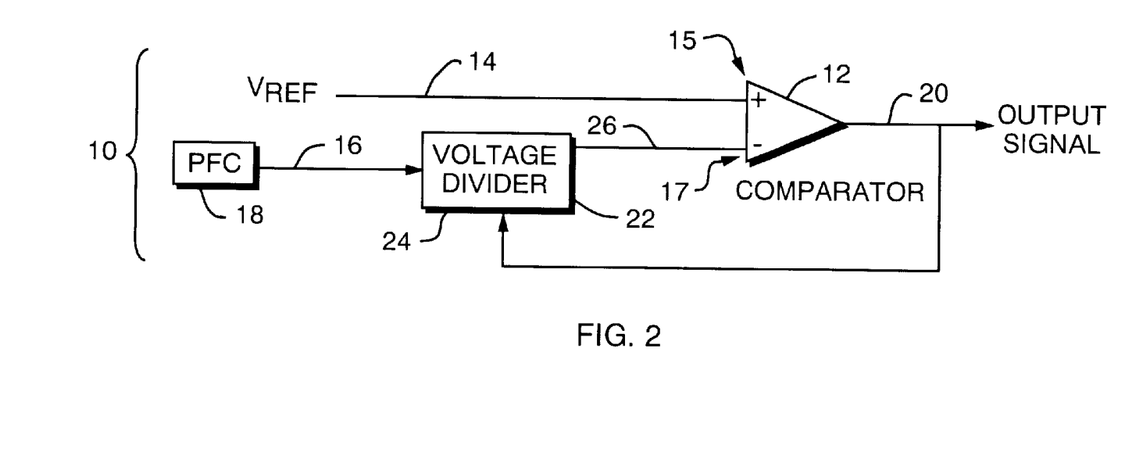
FIG. 2 shows another block diagram that illustrates an alternative design to the basic embodiment of this invention.

FIG. 2 illustrates another embodiment wherein responsive means 22 receives second signal 20 and first signal 16 and outputs third signal 26.

Responsive means 22, in both FIG. 1 and FIG. 2, creates a hysteresis effect in the comparison of first comparator input 15 and second comparator input 17 for which the comparator 12 transmits second signal 20. In this way, two different voltage thresholds $V_{th1}$ and $V_{th2}$ are maintained. A first voltage threshold $V_{th1}$ for power-up sequencing must be reached before second signal 20 which enables the DC-DC converter is generated by comparator 12. Once the power-up voltage threshold $V_{th1}$ is reached, responsive means 22 receives second signal 20, which triggers a change in at least one input signal to comparator 12. This change to at least one input to comparator 12 results in a second and lower voltage threshold $V_{th2}$; when the $V_{th2}$ threshold is crossed, outputting second signal 20. To recapitulate, the circuitry progresses through the following steps: 1) at the onset of power-up, $V_{pfc}$ is zero, the threshold voltage is set at $V_{th1}$, and second signal 20 is absent; 2) as the power-up progresses the PFC stage output voltage $V_{pfc}$ rises; 3) when the rising $V_{pfc}$ reaches $V_{th1}$, the comparator changes state, second signal 20 is present, and the threshold voltage is lowered to $V_{th2}$; 4) upon loss of input power, $V_{pfc}$ falls; and 5) when the falling $V_{pfc}$ reaches $V_{th2}$, the comparator reverts to its original state, second signal 20 is no longer present, and the threshold voltage is restored to $V_{th1}$. Second signal 20 enables and disables a DC-DC conversion device. In a preferred embodiment, second signal 20 is electrically coupled to a control pin on an integrated circuit controller to enable and disable the DC-DC conversion device.

Figure 3:
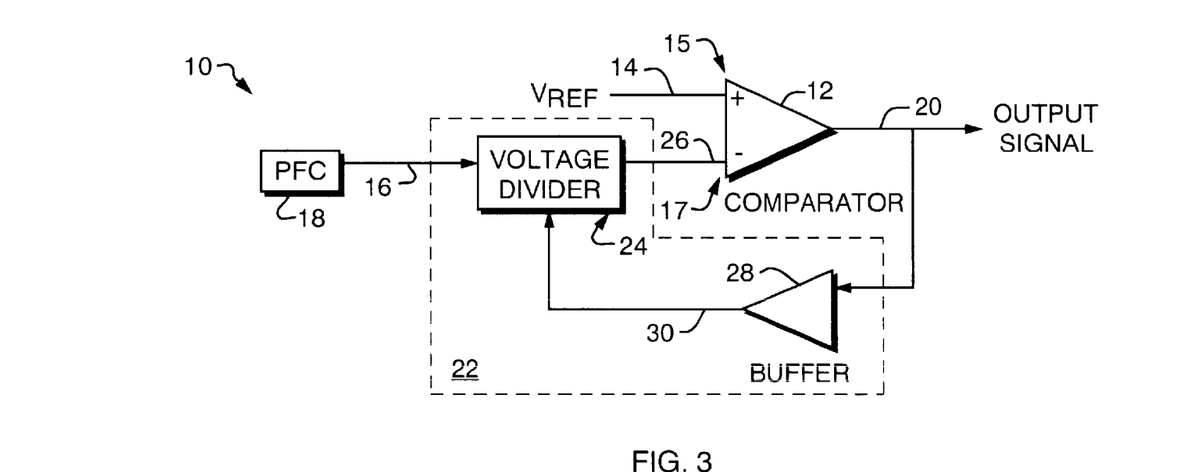
FIG. 3 shows a block diagram that illustrates a more specific embodiment of the invention shown if FIG. 2.

FIG. 3 illustrates another embodiment of this invention wherein responsive means 22 further comprises buffer 28. In this embodiment, buffer 28 transfers the functionality of second signal 20 to fourth signal 30, thus permitting modifications of second signal 20 such as voltage translation, scaling, and inversion without affecting the signal received by the DC-DC conversion device. In one embodiment, first signal 16 and fourth signal 30 are received by voltage divider circuit 24, which then outputs third signal 26 to the comparator 12 through second comparator input 17, although circuits other than voltage dividers may be used to receive first signal 16 and fourth signal 30 and transmit third signal 26.

Figure 4:
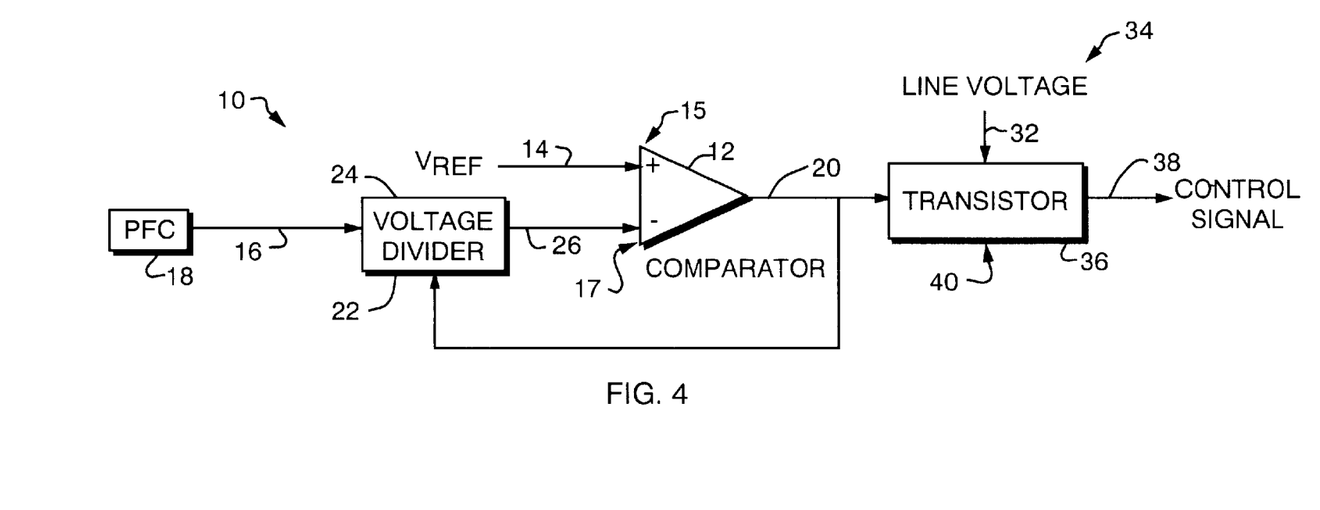
FIG. 4 shows a block diagram that illustrates the invention with a control signal generating means.

FIG. 4 illustrates a further embodiment of the present invention. In this embodiment, voltage threshold circuit 10 further comprises applied power signal 32. Applied power signal 32 may comprise line voltage source 34 as depicted in FIG. 4. Voltage threshold circuit 10 further comprises control signal generating means 36, which is responsive to applied initial power signal 32 and also to second signal 20 from comparator 12. Control signal generating means 36 generates control signal 38. Control signal 38 is disabling in response to initial receipt of applied power signal 32 and enabling in response to receipt of enabled second signal 20.

In a preferred embodiment, control signal generating means 36 comprises transistor 40. This embodiment functions as follows. During the initial power-up of circuit 10, applied power signal 32 sent to transistor 40 causes transistor 40 to disable control signal 38. When control signal 38 is disabled, the passage of power from the output of the PFC stage 18 through the downstream sections of the power conversion system is inhibited. Once $V_{pfc}$ reaches the power-up threshold voltage value $V_{th1}$, output from comparator 12 causes transistor 40 to output an enable control signal 38, which enables the passage of power through the power conversion system. If $V_{pfc}$ subsequently falls below the second threshold voltage value $V_{th2}$, second signal 20 from comparator 12 causes transistor 40 again to output a disable control signal 38, which again inhibits the passage of power through the power conversion system.

Figure 5:
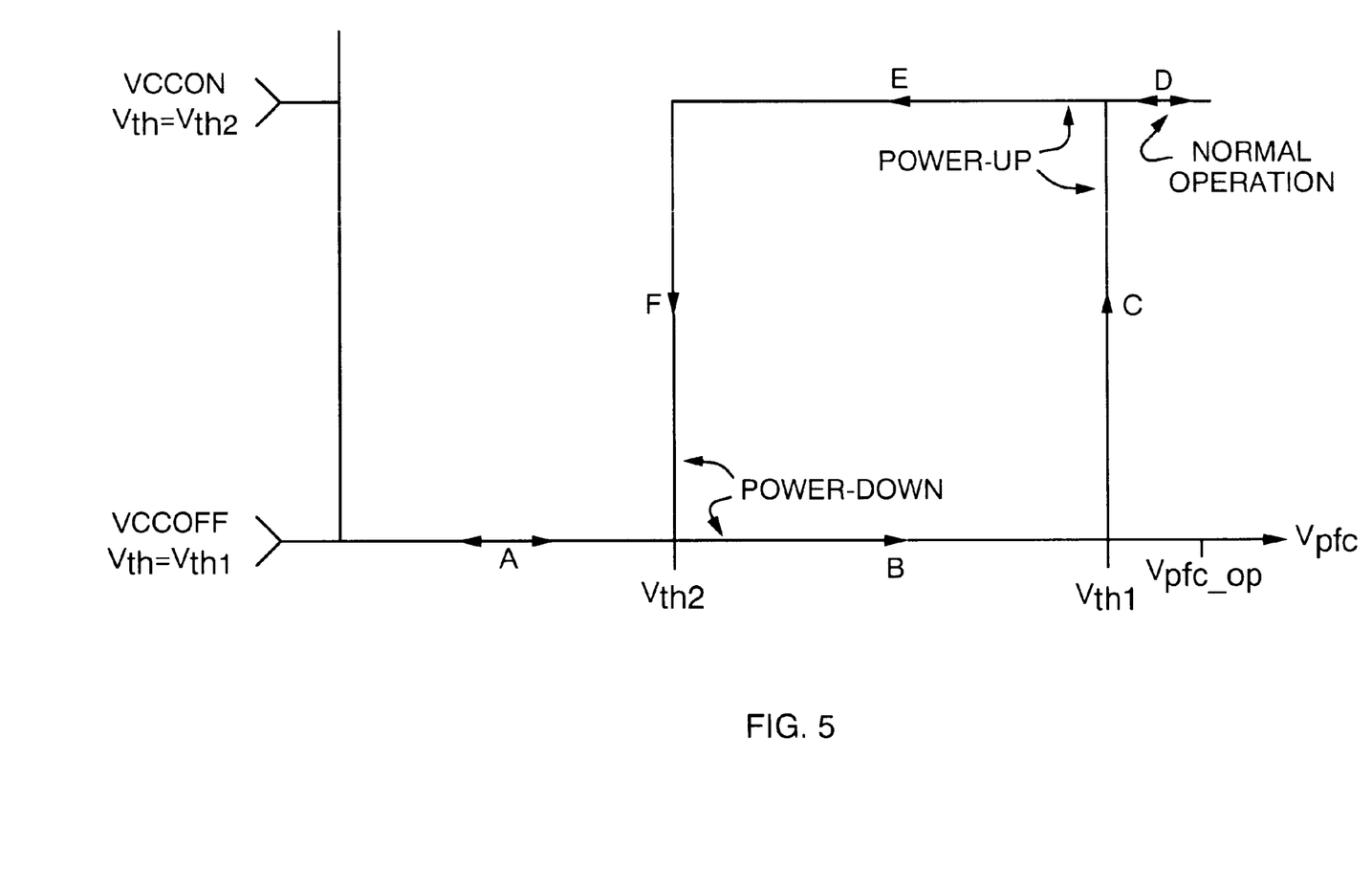
FIG. 5 is a hysteresis diagram representing the relationship between the signals received by the first and second comparator inputs.

FIG. 5 is a hysteresis diagram which illustrates the roles that power-up sequence and hold-up control threshold voltages play in the present invention. The diagram has a horizontal axis corresponding to $V_{pfc}$ and a vertical axis which shows the enabling (VCCON) and disabling (VCCOFF) states of control signal 38 and the corresponding threshold voltages.

Immediately following application of line power, with rising PFC stage output voltage $V_{pfc}$, the operating locus first traverses branch A and then branch B of the diagram; at this time the voltage threshold is set to $V_{th1}$ and control signal 38 is disabling (VCCOFF) which inhibits downstream power flow. When the rising $V_{pfc}$ reaches $V_{th1}$, the operating locus traverses branch C very rapidly as the comparator switches state; the threshold is changed to $V_{th2}$, and the control signal output transitions to VCCON, enabling downstream power flow. The PFC output voltage continues to rise along branch D to its operation value of $V_{pfc\_op}$. Upon interruption of line power, $V_{pfc}$ will start to fall; the PFC stage is no longer delivering power, and the DC-DC conversion device is operating from the stored energy of the PFC stage output capacitors. Traversal in the diagram of the operating locus will first be along branch D and then branch E in the direction indicated. If line power should resume before the falling $V_{pfc}$ reaches $V_{th2}$, the PFC stage will again supply power and the operating locus will traverse branch E in the reverse direction back towards $V_{pfc\_op}$. If such an event does not occur, then when the falling $V_{pfc}$ reaches $V_{th2}$, the operating locus will rapidly traverse branch F as the comparator switches back to its original state; the threshold is changed back to $V_{th1}$ and the control signal 38 to VCCOFF, again inhibiting downstream power flow. The path then continues along branch A to the origin.

It should be noted that the system is highly immune to a series of very rapid power interruptions such as might occur during a hot swap. Such an occurrence along the A and B branches would lead to no downstream power flow unless the series of power applications between interruptions resulted in $V_{pfc}$ attaining the $V_{th1}$ threshold, in which instance operation would switch to the D and E branches. Downstream power flow would then be enabled, but continuation of the rapid power interruptions would move the operating location back and forth along the D and E branches. Downstream power flow, however would not be interrupted unless the traversal from such repeated interruptions and applications resulted in a decline of $V_{pfc}$ to $V_{th2}$.

Figure 6:
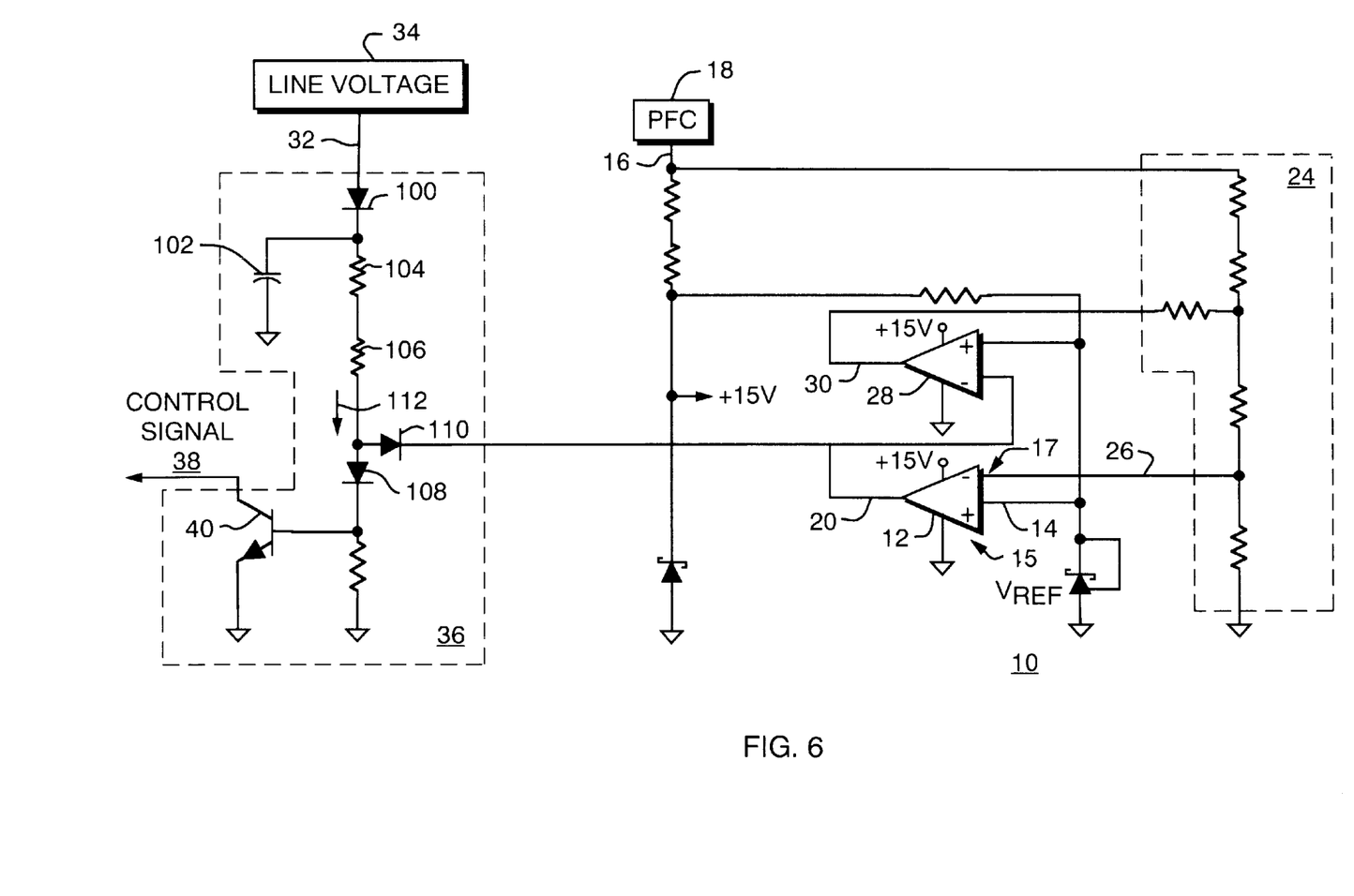
FIG. 6 is circuit schematic diagram of one alternative embodiment of this invention.

FIG. 6 illustrates a preferred embodiment of the present invention. In this embodiment, predetermined threshold voltage 14 is nominally 2.495V and is applied to the plus (non-inverting) inputs of both comparators 12 and 28. First signal 16 and fourth signal 30 are received by voltage divider 24 (resistors R3, R4, R5, R6, and R7) resulting in third signal 26 which in turn is applied to the minus (inverting) input of first comparator 12. Output 20 from first comparator 12 is applied to the minus input of second comparator, buffer 28. The function of second comparator, buffer 28, is merely to invert output 20. The +15V power supply to power comparators 12 and 28 results in nominal high and low output voltages of +15V and 0V for these comparators.

The two thresholds $V_{th1}$ and $V_{th2}$ have been defined previously. The plus and minus inputs of first comparator 12 must be equal at the instant of threshold detection; for this equality condition, simple circuit analysis of voltage divider 24 circuitry shown in FIG. 6 yields the following equation:

$$V_{th} = V_{14}\frac{R_{34} + R_{56}}{R_6} + \frac{R_{56}\,R_{34}}{R_6\,R_7} - V_{30}\frac{R_{34}}{R_7}$$

where $R_{34}=R_3+R_4$, $R_{56}=R_5+R_6$, $V_{14}=2.495V$, $V_{30}=0V$ or 15V, $V_{14}$ is the voltage value of predetermined threshold voltage 14, $V_{30}$ is the voltage value of fourth signal 30.

Evaluating this equation with the component values shown in FIG. 6 yields $V_{th}=390V$ for $V_{30}=0V$, and $V_{th}=280V$ for $V_{30}=15V$. Therefore $V_{th1}$ would be 390V and $V_{th2}$ would be 280V for that circuit design. A summary of the regions of operation is shown below, wherein State 1 is defined for a PFC output threshold voltage for power-up sequence and State 2 is similarly defined for hold-up control.

| State | Comparator 12 Inputs | Signal 20 | Signal 30 | Threshold ($V_{th}$) |
|---|---|---|---|---|
| 1 | Signal 26 < 2.495 V | +15 V | 0 V | $V_{th1}$/390 V |
| Transition | Signal 26 = 2.495 V | Undefined | | Undefined |
| 2 | Signal 26 > 2.495 V | 0 V | +15 V | $V_{th2}$/280 V |

The comparator 12 and buffer 28 in FIG. 6 have a "micropower design; they are fully functional down to 1.2V supply voltage and draws only 0.12 milliampere supply current. Further circuit analysis shows that as the first signal 16 increases from an initial value of 0V up to a value just under $V_{th1}$ (390V in FIG. 6), the value of predetermined threshold voltage 14 will always be positive with respect to third signal 26; therefore, the circuit will always power-up in State 1 as defined above. As $V_{pfc}$ equals and exceeds $V_{th1}$, the transition of first comparator 12 output 20 to 0V will cause buffer 28 output, fourth signal 30 to change to 15V which in turn transitions the circuit to State 2 as defined above. The circuit will remain in State 2 until $V_{pfc}$ decreases to a value less than $V_{th2}$; when that occurs, the circuit reverts to State 1 and the threshold to $V_{th1}$.

As shown in FIG. 6, voltage threshold circuit 10 further comprises control signal generation means 36 which is responsive to applied power signal 32, as applied through diode 100, and is further responsive to first comparator 12 output, second signal 20, through diode 110.

In control signal generation means 36, the components diode 100, capacitor 102, and resistors 104 and 106 function as a peak voltage storage circuit for the applied AC line voltage 34. The initial AC sinusoid, applied power signal 32 which passes through diode 100 will charge capacitor 102 to the peak voltage value (about 311V for a nominal 220VAC input); since the Resistor/Capacitor decay time constant for the values shown is 0.44 second, the voltage across capacitor 102 will nominally remain at this peak value until AC line voltage, line voltage source 34, is removed.

The stored voltage at capacitor 102 results in current flow 112 as shown through resistors 104 and 106. Since the anode voltage of diode 108 can be at most two diode drops (about 1.4V) positive with respect to ground potential, the current 112 is effectively constant for a given line voltage source 34. In State 1 as defined previously, second signal 20 is 15V and diode 110 is hence reverse biased. The current 112 will therefore flow into the base of transistor 40, turning on that device with the consequent result that the collector in transistor 40 becomes a current sink. Since in State 1, passage of power downstream of the PFC stage 18 is inhibited, this current-sinking at the collector in transistor 40 therefore corresponds to generation of disable control signal 38. Conversely, when the circuitry transitions to State 2, second signal 20 becomes 0V, current 112 is diverted from the base of transistor 40 turning off that device so that the collector in transistor 40 does not sink current; hence, lack of current-sinking at the collector in transistor 40 corresponds to enabling control signal 38.

Figure 7:
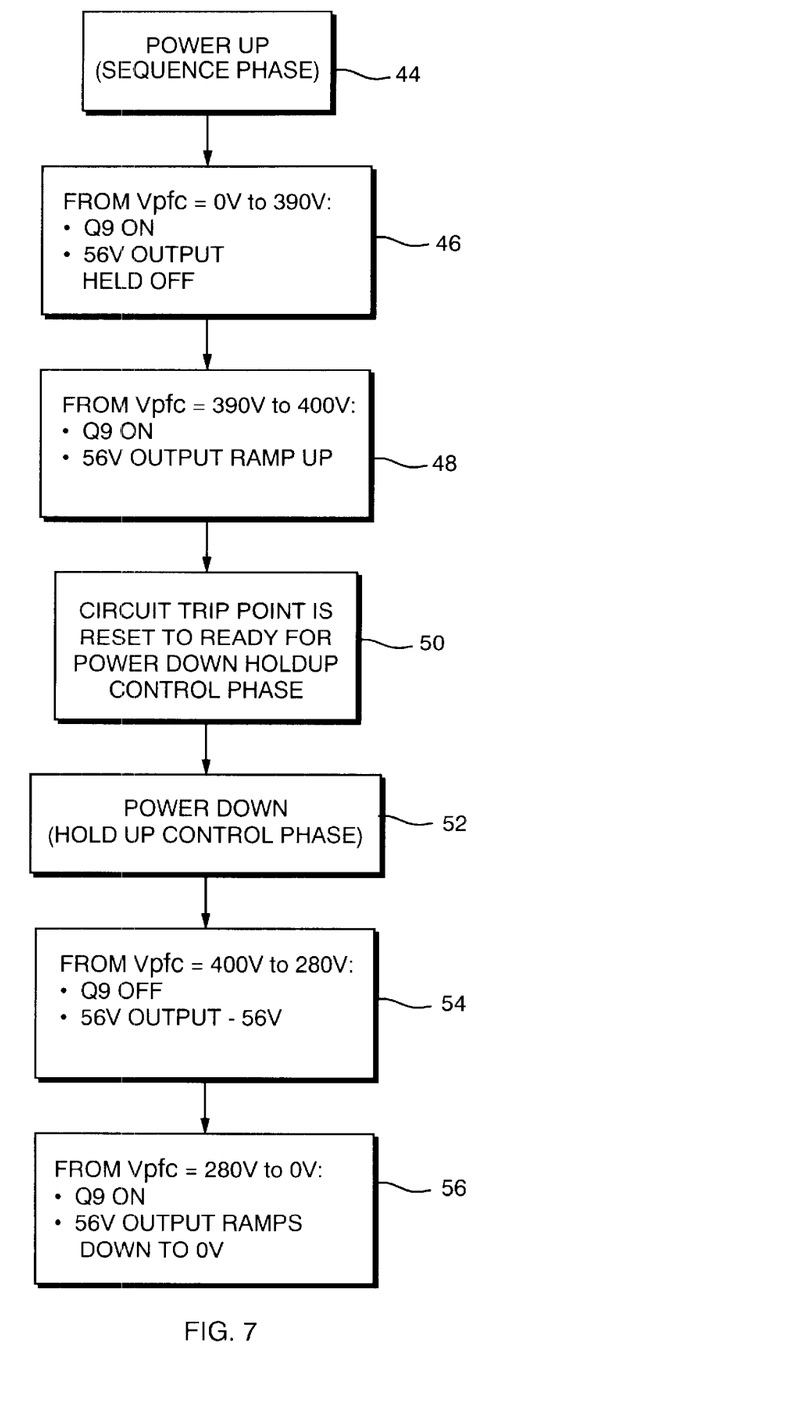
FIG. 7 is a flow diagram that illustrates the basic operation of one embodiment of this invention.

FIG. 7 illustrates a flow chart of the present invention. For purposes of functional illustration in this flow chart, the output voltage of the DC-DC power conversion circuitry is assumed as 56V. Power up, or sequence phase 44 represents the initial point of functionality wherein applied power signal 32 initiates a disable control signal 38 to the controller to inhibit passage of power downstream from the PFC stage 18. This disablement continues through representative block 46, where $V_{pfc}$, the first signal 16 from the PFC stage 18, rises from 0V to $V_{th1}$, the power-up sequence voltage threshold of 390V.

Block 48 represents the point at which the rising $V_{pfc}$ crosses the $V_{th1}$ threshold. When this threshold crossing occurs, a control signal 38 enables power flow downstream of the PFC stage 18. Also at this time, as represented in block 50, a second signal 20 activates responsive means 22 to change the voltage threshold to $V_{th2}$, the threshold for the hold-up control phase (in this instance, 280V).

Blocks 52 and 54 represent the power-down or hold-up control phase of operation during which power continues to be supplied from the PFC stage 18 through the downstream DC-DC power conversion circuitry so long as $V_{pfc}$ remains above the second threshold $V_{th2}$. Once $V_{pfc}$ falls below $V_{th2}$, a control signal 38 disables power flow downstream of the PFC stage 18, as is depicted by block 56 in FIG. 7.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a power conditioner characterized by the use of a power factor correction stage having an output voltage, a voltage threshold circuit comprising:
   a comparator with inputs and an output;
   a predetermined threshold voltage connected to a first comparator input and providing a first value to the first comparator input;
   a first signal corresponding to the output voltage of the power factor correction stage connected to a second comparator input and providing a second value to the second comparator input;
   a second signal corresponding to the output of the comparator and determined by a comparison of values of first and second comparator inputs; and
   a responsive means for altering one value in the group of first value and second value, in response to the second signal, changing the comparison of values of first and second comparator inputs.

2. The voltage threshold circuit of claim 1 wherein the comparator has an inverting input and a non-inverting input, the first comparator input being the non-inverting input of the comparator and the second comparator input being the inverting input of the comparator.

3. The voltage threshold circuit of claim 1 wherein the responsive means comprises an adjustable voltage divider.

4. The voltage threshold circuit of claim 3 wherein the voltage divider circuit receives the first signal and receives the second signal and transmits a third signal to the second comparator input, thereby the voltage divider is altering the second value provided to the second comparator input in response to the second signal.

5. The voltage threshold circuit of claim 1 wherein the responsive means further comprises a buffer circuit.

6. The voltage threshold circuit of claim 5 wherein the buffer circuit receives the second signal from the comparator and outputs a fourth signal which corresponds to the second signal but may be voltage translated, scaled or inverted with respect to the second signal.

7. The voltage threshold circuit of claim 6 wherein the responsive means further comprises a voltage divider circuit which intercepts the first signal and receives the fourth signal from the buffer and transmits a third signal to the second comparator input.

8. The voltage threshold circuit of claim 7 wherein the voltage divider receives the fourth and first signals, modifying and combining them to produce the third signal.

9. The voltage threshold circuit of claim 1 further comprising:
   an applied power signal;
   a signal generating means receiving both the applied power signal and the second signal; and
   a control signal transmitted by the signal generating means for enabling and disabling at least one downstream device.

10. The voltage threshold circuit of claim 9 wherein the signal generating means comprises a transistor.

11. In a power conditioner characterized by the use of a power factor correction stage having an output voltage, a voltage threshold circuit comprising:
    a comparison means for comparing a predetermined threshold voltage to a first signal corresponding to the output voltage of the power factor correction stage and outputting a second signal in response to the first signal being a value at least equal to the predetermined threshold voltage; and
    a responsive means responsive to the second signal for decreasing the predetermined threshold voltage, effectively changing the threshold voltage above which the comparison means continues to output the second signal.

12. In a power conditioner characterized by the use of a power factor correction stage having an output voltage, a voltage threshold circuit comprising:

a first signal corresponding to the output voltage of the power factor correction stage;

a voltage divider circuit, with at least two inputs and at least one output, which receives said first signal;

a comparator with inputs and an output;

a predetermined threshold voltage connected to a first comparator input and providing a first value to the first comparator input;

a third signal transmitted from the voltage divider circuit connected to a second comparator input and providing a second value to the second comparator input;

a second signal corresponding to the output of the comparator and determined by a comparison of values of the first and second comparator inputs;

a buffer circuit receiving the second signal;

a fourth signal transmitted by the buffer circuit corresponding to the second signal with signal alterations made by the buffer, and received by the voltage divider circuit, the voltage divider circuit is thereby modifying the first signal to create the third signal received by the comparator.

* * * * *